United States Patent [19]

Costes

[11] 4,395,381
[45] Jul. 26, 1983

[54] CONFINEMENT ENCLOSURE, NOTABLY FOR A NUCLEAR REACTOR

[75] Inventor: Didier Costes, Meudon, France

[73] Assignee: Commissariat a l'Energie Atomique, Paris, France

[21] Appl. No.: 240,548

[22] Filed: Mar. 4, 1981

Related U.S. Application Data

[63] Continuation of Ser. No. 4,338, Jan. 18, 1979, abandoned.

[30] Foreign Application Priority Data

Jan. 30, 1978 [FR] France .................................. 78 02498

[51] Int. Cl.³ .............................................. G21C 9/00
[52] U.S. Cl. ........................................ 376/293; 376/313
[58] Field of Search ........................ 376/313, 293–296

[56] References Cited

U.S. PATENT DOCUMENTS

| | | | |
|---|---|---|---|
| 3,438,857 | 4/1969 | Sulzer | 376/293 |
| 3,444,725 | 5/1969 | Chave | 376/293 |
| 3,718,539 | 2/1973 | West et al. | 376/293 |
| 3,801,444 | 4/1974 | Kraemer | 376/295 |
| 3,991,899 | 11/1976 | Vaessen | 376/293 |
| 4,213,824 | 7/1980 | Jabsen | 376/293 |
| 4,243,485 | 1/1981 | Chabin | 376/313 |
| 4,244,153 | 1/1981 | Schwarzer et al. | 376/293 |
| 4,277,309 | 7/1981 | Schabert | 376/313 |
| 4,297,167 | 10/1981 | Schabert | 376/313 |

FOREIGN PATENT DOCUMENTS 33557 6/1973 Luxembourg.

Primary Examiner—Sal Cangialosi

[57] ABSTRACT

A confinement enclosure, notably for a nuclear reactor, of the type consisting of reinforced, possibly prestressed concrete, comprising in the body of the wall a drainage network consisting of tubular channels provided in the concrete, wherein the tubular channels of the drainage network, which may be grouped in sub-groups, are connected to a system of filters located inside the enclosure.

3 Claims, 3 Drawing Figures

CONFINEMENT ENCLOSURE, NOTABLY FOR A NUCLEAR REACTOR

This is a continuation, of application Ser. No. 004338 filed Jan. 18, 1979, now abandoned.

BACKGROUND OF THE INVENTION

In industrial technology, there are certain cases where a confinement building is required in order to isolate, from the outside world, certain installations which are dangerous owing to the fact that they are liable to emit pollutants, especially radioactive products, which, to comply with the safety standards, must not simply be discharged into the atmosphere. This is particularly true of nuclear reactors, to which reference will be made exclusively hereinafter, although it should be realised that this example is entirely non-restrictive and that this invention covers confinement enclosure in general for all installations capable of releasing dangerous products either temporarily or permanently.

Nuclear reactors are generally sited inside confinement enclosures designed to maintain a satisfactory level of leaktightness against radioactive products liable to escape from the primary circuit of the reactor during certain incidents, especially incidents which put the interior of the enclosure under pressure. In some constructions, this leaktight seal is obtained, in particular, by means of an impermeable membrane applied to the inside of the reinforced or prestressed concrete wall; in other constructions, it has been proposed to construct the enclosure with no membrane but with a double wall, with an intermediate space between the two walls serving to collect the gases, liquids and aerosols liable to pass through the inner or outer walls at a moderate rate of flow; the two walls are independent over their full height above ground level.

This arrangement ensures excellent confinement in the case of the accidents for which it is designed, but on the one hand it requires the use of special equipment at the moment when an accident occurs, which means that stringent precautions must be taken to ensure reliability, and on the other hand the arrangement does not make the best use of the materials as regards resistance to extreme loads. In fact, if the internal pressure increases to the point of causing cracking or fracture of the inner enclosure, the outer enclosure may be subjected to the full pressure within the confinement enclosure, and it will be appreciated that the resistance of the two independent walls in series is finally only as great as that of the stronger wall. For dynamic impact due to seismic shocks or impact from projectiles originating from inside or outside, better resistance is again generally obtained by using the entire mass of materials used in the construction of the walls to form a single thick enclosure.

From this point of view, confinement enclosures have already been proposed consisting of a single wall of reinforced concrete, more particularly prestressed concrete, characterised by the existence of a drainage network within the wall itself; this is the case particularly in Luxembourg patent 33.557 amd U.S. Pat. Nos. 3,320,969 and 3,778,948. In these known solutions, this drainage network usually consists of a set of holes in the form of parallel tubular channels produced during the casting of the concrete, with their openings arranged close enough together to ensure that any accidental crack will necessarily meet one of the channels or its porous surroundings, if any, thus enabling the pollutant phase to be drained off accordingly. The holes in the form of tubular channels are theoretically arranged in random directions inside the body of the wall, even though, for practical reasons, it is more convenient to make them vertical or horizontal; these two latter systems may, moreover, coexist, possibly comprising junction points. Sometimes there is advantageously provided within the wall of the enclosure a special permeable layer, e.g. of porous concrete, in which the drainage channels are located, thus increasing the efficiency of the arrangement; occasionally, also, inclusions of permeable strips consisting of tubes filled with gravel which connect the drainage channels of one of the horizontal or vertical systems to one another are provided during the casting of the concrete.

The known drainage networks provided in confinement enclosures are generally linked to a system for sucking escaped substances through external filters; the fluid circulating in the drainage network is usually gaseous and both the internal, possibly pollutant, gaseous phase and the outer air which would tend to pass through the wall of the enclosure which is assumed to be cracked following an accident occurring either internally or externally are drained into the said network, which has been put under vacuum by means of an extractor fan and a filter located outside the enclosure. This gaseous phase is filtered and then ejected into the outer atmosphere. However, in all these known systems, it is necessary to use suction systems or mechanical vacuum systems on which the safety of the installation depends, in the last analysis, and which cannot therefore ensure total reliability.

BRIEF SUMMARY OF THE INVENTION

This invention relates to a confinement enclosure provided with a drainage network which obviates the disadvantage mentioned above, whilst combining the advantages of the solidity of a single thick wall with those of a means of collecting leakages in an intermediate layer situated inside the body of the wall.

This confinement enclosure is essentially characterised in that its drainage network is under pressure and that it can function to the limit entirely passively without the need for any external energy source, thus making it remarkably reliable in the case of accidents.

The confinement enclosure according to the invention may take the form of one of two main distinct embodiments.

In the first embodiment, the drainage network is simply connected to passive filters located within the enclosure; in this way, using very simple, safe means, adequate protection is obtained against the statistically fairly common event of an accident resulting in pollution of the inside of the enclosure accompanied by excess pressure therein: this excess pressure is then sufficient to cause the major portion of the polluted internal gaseous phase to escape outside through the filters and drainage system; in other words, the installation itself forces all the dangerous gaseous fluid liable to escape to pass through the passive filters, without the need for any pumping or suction apparatus.

In the second embodiment of the drainage network, the fluid circulating therein is a liquid under hydrostatic pressure, usually water. This water under pressure thus constitutes an actual damming layer in the body of the wall of the enclosure and flows both inwards and outwards in the case of severe cracking of the wall, thus preventing the dangerous internal medium from escaping. In practice, this result is obtained by dividing the drainage network into a plurality of independent zones or sub-groups each of which is connected to at least one water reservoir located at a higher level than that of the corresponding zone; in this case, one particular zone may be constituted by the frame of the confinement wall itself.

BRIEF DESCRIPTION OF THE DRAWINGS

In any case, the invention will be more readily understood with reference to the following description of two exemplary embodiments of a confinement enclosure for a nuclear reactor according to the invention. This description, which is given as an illustration and not in any restrictive capacity, refers to FIGS. 1 to 3, wherein.

DETAILED DESCRIPTION OF THE PREFERRED EMBODIMENTS

Figure 1:
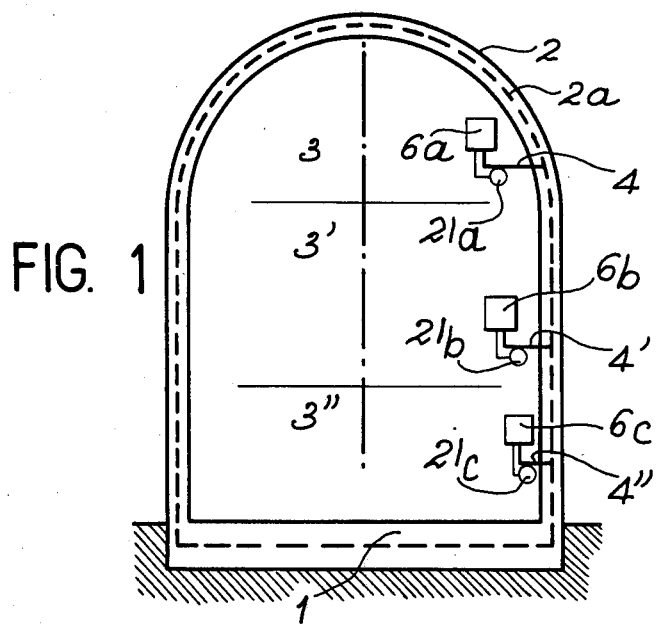
FIG. 1 shows a diagrammatic section through a confinement enclosure equipped with a drainage system connected to internal passive filters.

The confinement enclosure with a suction means for leaks according to FIG. 1 comprises a wall consisting of a general frame 1 and an elevated structure 2, all made from reinforced prestressed concrete; the reinforcements are not shown, nor is the nuclear reactor which the enclosure contains. The thickness of the wall of the building is, for example, of the order of 1/20 to 1/10 of the radius. The drainage layer 2a shown by a broken line consists of juxtaposed zones or sub-groups such as 3, 3', 3", each ending in a collector 4, 4', 4"; filters such as 6a, 6b, 6c are provided inside the enclosure and are connected to the network 2a by ventilators such as 21a, 21b, 21c which ventilators place the drainage network under higher pressure compared with the pressure existing in the enclosure itself. The system is therefore a damming containment rather than a drainage system. If no accidents occur, the ventilators function normally at reduced power and, using devices (not shown), the preferential leakage zones can be detected so that they can be repaired. If an accident occurs, the power of the ventilators is increased in order to maintain the network 2a under overpressure relative to the inside and thus prevent any pollution from entering; thus, leaks towards the outside are from a gas which has been filtered previously. If the ventilators 21a, 21b, 21c break down, this filtering still occurs to a large extent, in that the filters 6a, 6b, 6c are much more permeable than the wall separating the interior of the enclosure from the drainage network 2a.

Figure 2:
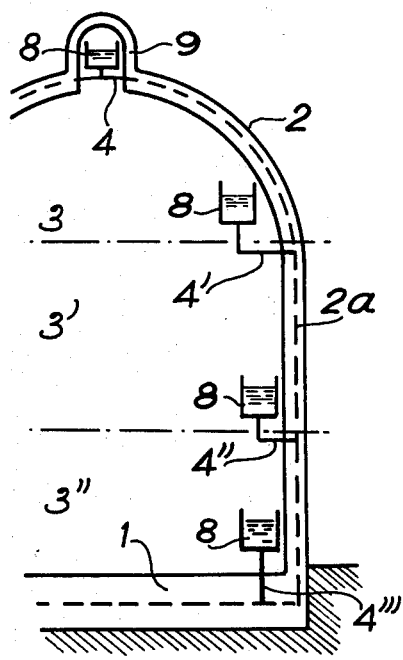
FIG. 2 shows a diagrammatic section through a confinement enclosure equipped with a drainage system under hydrostatic pressure.

The confinement enclosure with the water dam according to FIG. 2 is on the whole identical to that described above, but differs from it in that each drainage region is connected to a water reservoir such as 8 inside the enclosure, at a higher level than the said region. Thus, in the case of an accident with an internal build-up of pressure, the damming water pressure is automatically adjusted. For the upper region of the enclosure, the reservoir may be arranged in a turret 9 which cannot be guaranteed leaktight by the damming liquid itself but which may be specially resistant to prevent any local increase in the risks; the reservoir may also be mounted inside the enclosure and an automatic pump be used to complete the loading. The function of the damming water is to provide a liquid protective wall and to be the first substance to escape, instead of the polluted internal medium, if serious cracking occurs. It also brings about an important additional advantage in that it continuously moistens the concrete in its central part and thus prevents it from shrinking and cracking and keeps it leaktight. The water used is advantageously treated with basic additives to prevent deterioration of the concrete and corrosion of the reinforcements in the case of leakages circulating continuously, but every effort should, of course, be made to ensure that the walls are constructed so as to be perfectly leaktight and to repair them if there is any local deterioration, which is easy to detect by the patches of dampness. In some countries, it may also be advisable to incorporate antifreeze additives in the water. In normal operation, monitoring the level of the reservoirs is a means of assessing the degree of leaktightness obtained; in the case of accidents, these reservoirs may be topped up with uncontaminated emergency cooling water from the reactor to prevent any radioactivity leak into the atmosphere. Periodic tests for leaktightness could be carried out by putting the networks under high pressure.

In the example shown in FIG. 2, the drainage network 2a extends to the frame 1 of the enclosure 2 and communicates, via the duct 4''', with a corresponding water reservoir 8. Such protection of the frame 1 proves very useful in minimising the consequences of a serious accident such as the fusion of the core of a nuclear reactor, when the reinforced concrete frame is the chief obstacle in the path of the molten material coming from the core and tank.

In fact, in an accident of this kind, the molten materials first of all progress downwards, spreading out laterally, decomposing the hydrates and liberating water, with reduction of this water by the metals, resulting in the production of hydrogen, and the carbonates with the release of carbon dioxide. A thermal front in the concrete precedes and promotes the chemical attack owing to the thermal stresses, which cause intensive cracking. When this front reaches the region of the channels, which are under water pressure, the cracking causes upward leaks and these cool the concrete, whilst the water evaporates and the vapour, having come into contact with the molten mass, escapes in the form of bubbles, thus causing the concrete to cool. The descent of the molten materials may thus stop slightly above the bed of channels.

Naturally, the pitch and diameter of these channels must be made optimal, as must the water pressure, and several beds of channels of different diameters may be provided beneath the tank.

Figure 3:
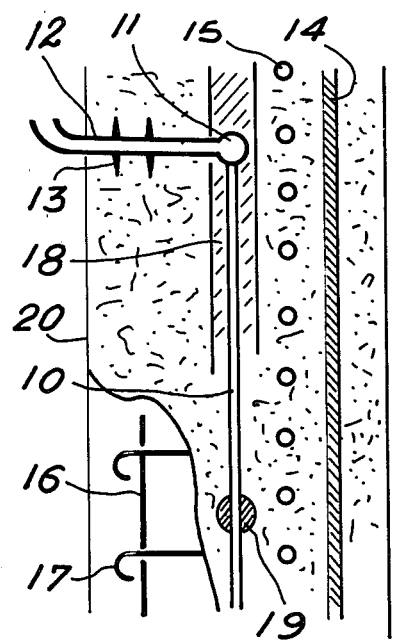
FIG. 3 shows in detail the construction of the wall of one of the enclosures in FIGS. 1 and 2.

FIG. 3 shows, in section, a vertical wall 20 equipped with a drainage system according to the invention. Vertical channels 10 are shown, which appear to be easier to construct, but the channels could also be horizontal or peripheral. They are produced during casting of the concrete, in known manner, by arranging in the formwork rubber tubes inflated with water and held in a straight line by internal steel rods, to resist any deviations caused by forces occurring during the positioning of the concrete; these rods and tubes can readily be removed after the concrete has set, at heights of more than 10 m. A set of vertical tubes is connected, by means of an upper collector 11 with a connecting tube 12, to the corresponding reservoir (not shown) in the case of the embodiment according to FIG. 2 and to the corresponding filter (not shown) in the case of the embodiment according to FIG. 1. The tight seal required round the tube 12 where it passes through the inner part of the wall 20 may be obtained using known devices such as guard discs 13 combined with an injection of cement mortar between the discs. Vertical prestressing reinforcements such as 14 and horizontal ones such as 15 and steel connecting means such as 16 and 17 which prevent in particular any widthways flaking of the wall are provided in the wall.

The network of drainage or topping-up channels may be placed either in the ordinary concrete used to build the wall or in a special permeable layer 18, notably consisting of concrete with a large proportion of cavities. Permeable inclusions arranged in horizontal strips such as 19 which link the vertical channels and consist of permeable tubes filled with gravel may also be provided in the concrete during casting. The arrangement of all the channels and possible additional permeable devices should be such that, in the event of the wall 20 cracking due to an overload, there is no risk of anything passing directly through the wall without coming into contact with the drainage network. In a wall 2 m thick, there could be a network consisting of channels 0.04 m in diameter at a spacing of 0.5 m.

Therefore, a confinement enclosure according to the invention when compared with known enclosures has the advantages of being very easy to produce and virtually leaktight in the case of any accidents which can be foreseen, whilst giving a resistance to extreme loads which is as great as the mass of materials used will permit. The features described for the wall with the drainage or topping-up network incorporated in it also extend to cover various other embodiments, especially in underground construction.

The invention is not limited to the embodiments described and represented hereinbefore and various modifications can be made thereto without passing beyond the scope of the invention.

I claim:

1. A confinement enclosure for a nuclear reactor, comprising:
   a housing in which a nuclear reactor is located, said housing consisting of a single wall formed of reinforced concrete;
   containment means in said single wall for preventing flow of gas through said wall in the event of an accident involving the nuclear reactor, said containment means including a network of channels defined in said wall;
   filter means located within said housing and fluidly connected to said channels to filter any fluid entering said channels from within said housing; and
   pressurizing means for connecting said filter means to said containment means, said pressurizing means being fluidly connected to said channels and at all times maintaining a pressure on filtered fluid inside said channels at a level which is higher than the pressure inside said housing and higher than any fluid by-passing the filter means and passing through a crack in said wall;
   whereby any fluid by-passing the filter means is prevented from entering any channel and only fluid passing through said filter means into said channels is permitted to reach the outside of said housing.

2. A confinement enclosure for a nuclear reactor, comprising:
   a housing in which a nuclear reactor is located, said housing consisting of a single wall formed of reinforced concrete;
   containment means in said single wall for preventing flow of gas through said wall in the event of an accident involving the nuclear reactor, said containment means including a network of channels defined in said wall;
   pressurizing means fluidly connected to said channels and at all times maintaining a pressure on fluid inside said channels at a level which is higher than the pressure inside said housing and higher than any fluid passing through a crack in said wall, said channels being located in a plurality of zones with each zone corresponding to a section of wall height, said channels being grouped according to said zones, and the channels of each zone being filled with water in communication with said pressurizing means constituted by a free level water reservoir located inside the enclosure at a higher level than the corresponding height section;
   whereby any fluid passing through a crack in said wall is prevented from entering any channel and only fluid passing into said channels is permitted to reach the outside of said housing.

3. A confinement enclosure according to claim 2, wherein said housing has a bottom provided with a drainage network filled with water from a free level reservoir inside the enclosure, the pressure in said drainage network being established by said reservoir.

* * * * *